United States Patent
Rao et al.

(10) Patent No.: US 10,202,024 B2
(45) Date of Patent: Feb. 12, 2019

(54) VEHICLE DOOR ASSEMBLY WITH REMOVABLE DOOR PANEL FOR EASY INGRESS AND EGRESS

(71) Applicant: FORD GLOBAL TECHNOLOGIES, LLC, Dearborn, MI (US)

(72) Inventors: Manoharprasad K. Rao, Novi, MI (US); Hubert Szawarski, Waterford, MI (US); Mark A. Cuddihy, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 15/369,254

(22) Filed: Dec. 5, 2016

(65) Prior Publication Data

US 2018/0154743 A1 Jun. 7, 2018

(51) Int. Cl.
*B60J 5/00* (2006.01)
*B60J 5/04* (2006.01)
*B60R 7/04* (2006.01)
*B60R 13/02* (2006.01)

(52) U.S. Cl.
CPC ........... *B60J 5/0412* (2013.01); *B60J 5/0469* (2013.01); *B60R 7/046* (2013.01); *B60R 13/0243* (2013.01)

(58) Field of Classification Search
CPC ........ B60J 5/0412; B60J 5/0469; B60R 7/046
See application file for complete search history.

(56) References Cited

U.S. PATENT DOCUMENTS

| | | | |
|---|---|---|---|
| 5,327,682 A * | 7/1994 | Holtz | E04F 19/08 16/254 |
| 5,934,532 A | 8/1999 | Rausch et al. | |
| 6,412,852 B1 * | 7/2002 | Koa | B60R 13/0206 296/146.5 |
| 8,059,830 B1 * | 11/2011 | Gleason | H04R 5/04 381/86 |
| 8,210,590 B1 | 7/2012 | Moberg et al. | |
| 8,544,928 B2 | 10/2013 | Orlowsky et al. | |
| 2006/0064938 A1 * | 3/2006 | Unterreiner | B60J 5/0404 49/502 |
| 2013/0168992 A1 | 7/2013 | Orlowsky et al. | |
| 2016/0185300 A1 | 6/2016 | Parlow et al. | |

FOREIGN PATENT DOCUMENTS

FR  2497741 A1 * 7/1982 ............. B60N 3/103
JP  3014724 A    1/1991

OTHER PUBLICATIONS

English Machine Translation of JP3014724A.

* cited by examiner

*Primary Examiner* — Lori L Lyjak
(74) *Attorney, Agent, or Firm* — Vichit Chea; King & Schickli, PLLC

(57) ABSTRACT

A vehicle door assembly includes a primary door body having a receiver, a removable interior door panel and a retainer. That retainer secures the removable interior door panel to the receiver. A related method of enhancing the ease of ingress and egress from a motor vehicle is also disclosed.

17 Claims, 10 Drawing Sheets

VEHICLE DOOR ASSEMBLY WITH REMOVABLE DOOR PANEL FOR EASY INGRESS AND EGRESS

TECHNICAL FIELD

This document relates generally to the motor vehicle equipment field and, more particularly, to a new and improved vehicle door assembly that incorporates a removable door panel as well as to a method of enhancing the ease of ingress and egress from a motor vehicle when an adjacent obstruction limits how far the vehicle door assembly may be opened.

BACKGROUND

Interior space in today's motor vehicles is often limited due to new features and hardware added to the motor vehicles. One structure that consumes a significant volume of space inside a motor vehicle is a lower door trim panel under the arm rest. Such a panel typically incorporates bins and cup holders increasing the distance the panel extends inward from the door body and thereby making it difficult to enter and exit the vehicle in crowded parking lots where a nearby obstruction limits the angle to which the door may be opened. Under such circumstances, the gap between the bottom of the door and the rocker panel of the automobile is small.

This document relates to a new and improved vehicle door assembly incorporating a removable door panel that increases the space between the rocker panel and the bottom of the door body to allow easier ingress and egress even when an obstruction limits the angle to which the door may be opened. In addition, this document relates to a vehicle door assembly incorporating a modification kit that includes multiple removable interior door panels having different article storage bin structures. Those multiple removable door panels are interchangeable so as to allow a motor vehicle operator to tailor or customize the storage options on the vehicle door assembly to meet the needs of the user for any particular application desired.

Accordingly, it should be appreciate that the vehicle door assembly disclosed herein represents a significant advance in the art.

SUMMARY

In accordance with the purposes and benefits described herein, a vehicle door assembly is provided. That vehicle door assembly includes a primary door body including a receiver and a removable interior door panel. In addition, the vehicle door assembly includes a retainer for securing the removable interior door panel to the receiver. That retainer may be selected from a group consisting of a magnetic connector, an attachment track or a magnetic connector and an attachment track.

The removable interior door panel of the vehicle door assembly may further include an article storage bin that projects away from the primary door body. Further, the primary door body may include an armrest and the retainer may include (a) a securing slot in the receiver under and adjacent to the arm rest and (b) a cooperating securing tab on the removable interior door panel engaged in the securing slot.

The retainer of the vehicle door assembly may include at least one set of magnetic connectors having a first element carried on the receiver and a second element carried on the removable interior door panel wherein the first element is aligned with and attracted to the second element in order to hold the removable interior door panel in position on the primary door body.

One set of magnetic connectors may be provided adjacent a bottom edge of the primary door body. In addition, the primary door body may include a speaker assembly and the removable interior door panel may include a mounting tab engaging the speaker assembly.

In other of many possible embodiments, the vehicle door retainer of the vehicle door assembly may comprise a first attachment track along a motor vehicle-rearward edge of the receiver and a second attachment track along a motor vehicle-forward edge of the receiver. Further, the vehicle door assembly may include a lug adjacent a bottom edge of the receiver.

The vehicle door assembly may further include a first follower on the removable interior door panel engaged in the first attachment track and a second follower on the removable interior door panel engaged in the second attachment track. In addition, the removable interior door panel may include a recess or pocket receiving or engaging the lug.

In accordance with an additional aspect, the vehicle door assembly may include a modification kit. That modification kit may include a second removable interior door panel having a second, different article storage bin. The second removable interior door panel is interchangeable with the first interior removable door panel and, therefore, may be substituted on the receiver for the removable interior door panel to tailor the storage options on the vehicle door assembly for a particular application.

Still further, the modification kit may include a third removable interior door panel having a third, different article storage bin. The third removable interior door panel may be interchangeable with the first and second removable interior door panels and may be substituted therefor on the receiver to further tailor or customize the storage options on the vehicle door assembly. Still further, the modification kit of the vehicle door assembly may include a fourth removable interior door panel having a fourth, different article storage bin. The fourth removable interior door panel is interchangeable with the first, second and third removable interior door panels and may be substituted on the receiver to tailor the storage space at the bottom of the vehicle door assembly to be better suited for still other uses or storage applications.

In accordance with an additional aspect, a method is provided of enhancing the ease of ingress and egress from a motor vehicle when an adjacent obstruction limits how far a vehicle door assembly may be opened. That method may be described as including the step of removing a removable interior door panel from a receiver on a primary door body of the motor vehicle door assembly. This is done in order to provide additional space between the primary door body and a door threshold or rocker panel of the motor vehicle when the vehicle door assembly is partially opened.

The method may further include the step of releasing a retainer prior to removing the removable interior door panel from the receiver on the primary door body.

In accordance with yet another aspect, a method is provided of customizing a motor vehicle door assembly to meet the needs of a particular article transport application. That method comprises the steps of: (a) selecting a particular removable door panel with a particular article storage bin from a plurality of interchangeable removable door panels and (b) securing the particular removable door panel with the particular article storage bin to a receiver on the primary door body of the motor vehicle.

The method may also include the steps of removing the particular removable door panel from the receiver, selecting a second removable door panel from the plurality of interchangeable removable door panels and securing the second removable door panel to the receiver on the primary door body.

In the following description, there are shown and described several preferred embodiments of the vehicle door assembly. As it should be realized, the vehicle door assembly is capable of other, different embodiments and its several details are capable of modification in various, obvious aspects all without departing from the vehicle door assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle door assembly and together with the description serve to explain certain principles thereof. In the drawing figures.

FIGS. 3a-3d are perspective views illustrating respective vehicle door assemblies incorporating a first removable interior door panel, a second removable interior door panel, a third removable interior door panel and a fourth removable interior door panel which are interchangeable and may be utilized to tailor the storage available on the vehicle door assembly by connecting any particular removable interior door panel to the receiver of the primary door body.

Figure 4A:
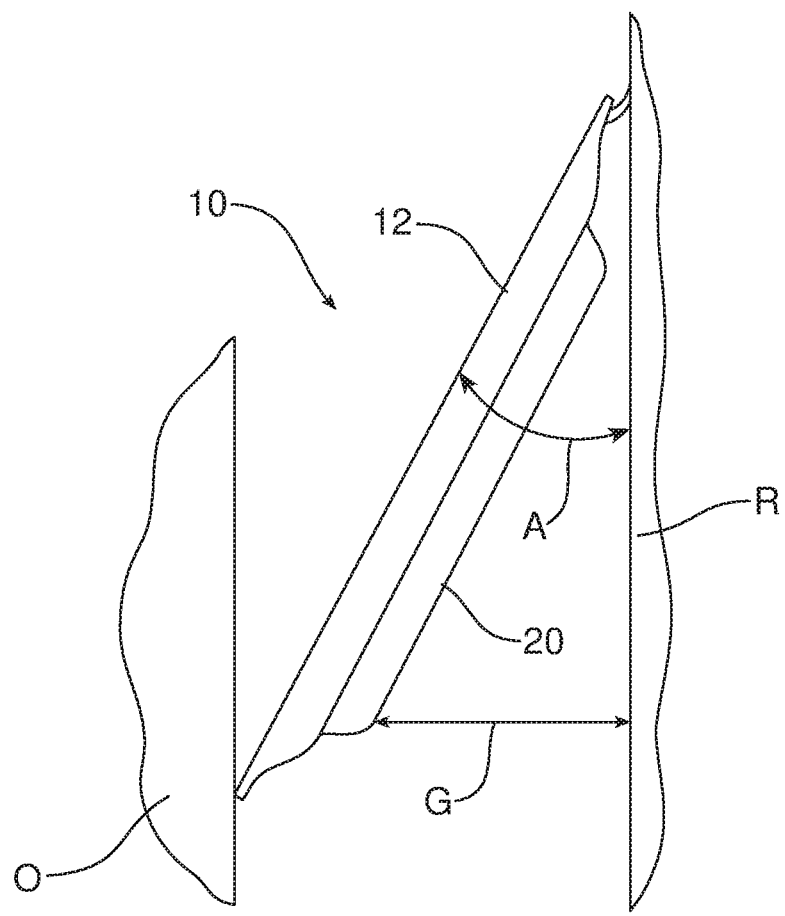

FIG. 4a illustrates the relatively limited space to enter or exit a motor vehicle when an obstruction limits the angle to which the vehicle door assembly may be opened.

Figure 4B:
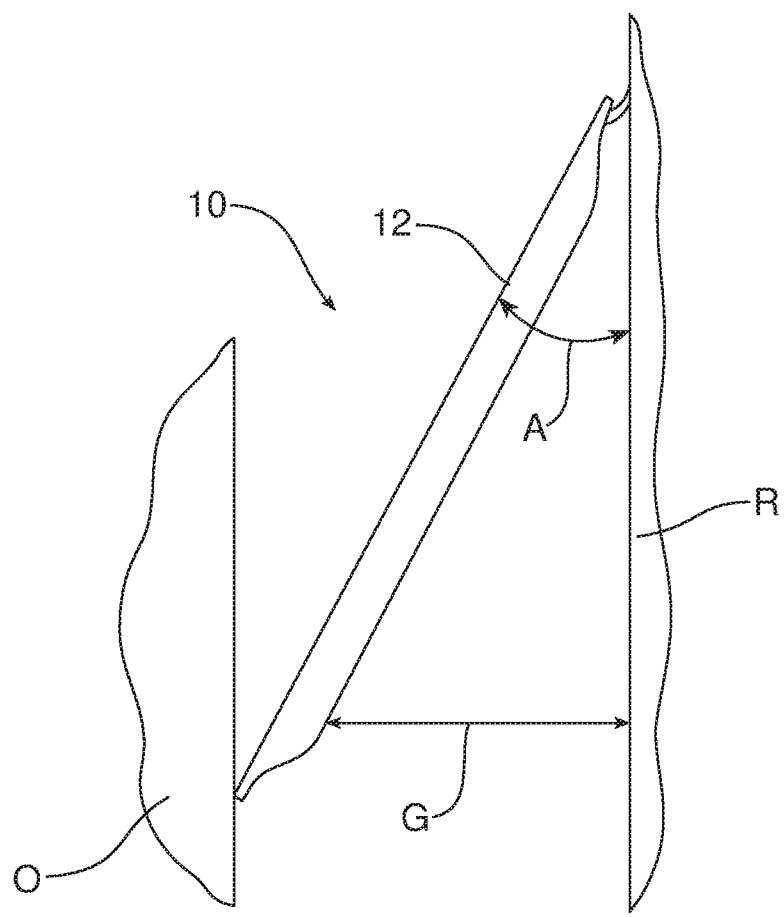

FIG. 4b illustrates how the available space for ingress and egress may be dramatically increased by removing the removable interior door panel from the primary door body prior to entering or exiting the vehicle.

Reference will now be made in detail to the present preferred embodiments of the vehicle door assembly, examples of which are illustrated in the accompanying drawing figures.

DETAILED DESCRIPTION

Figure 1A:
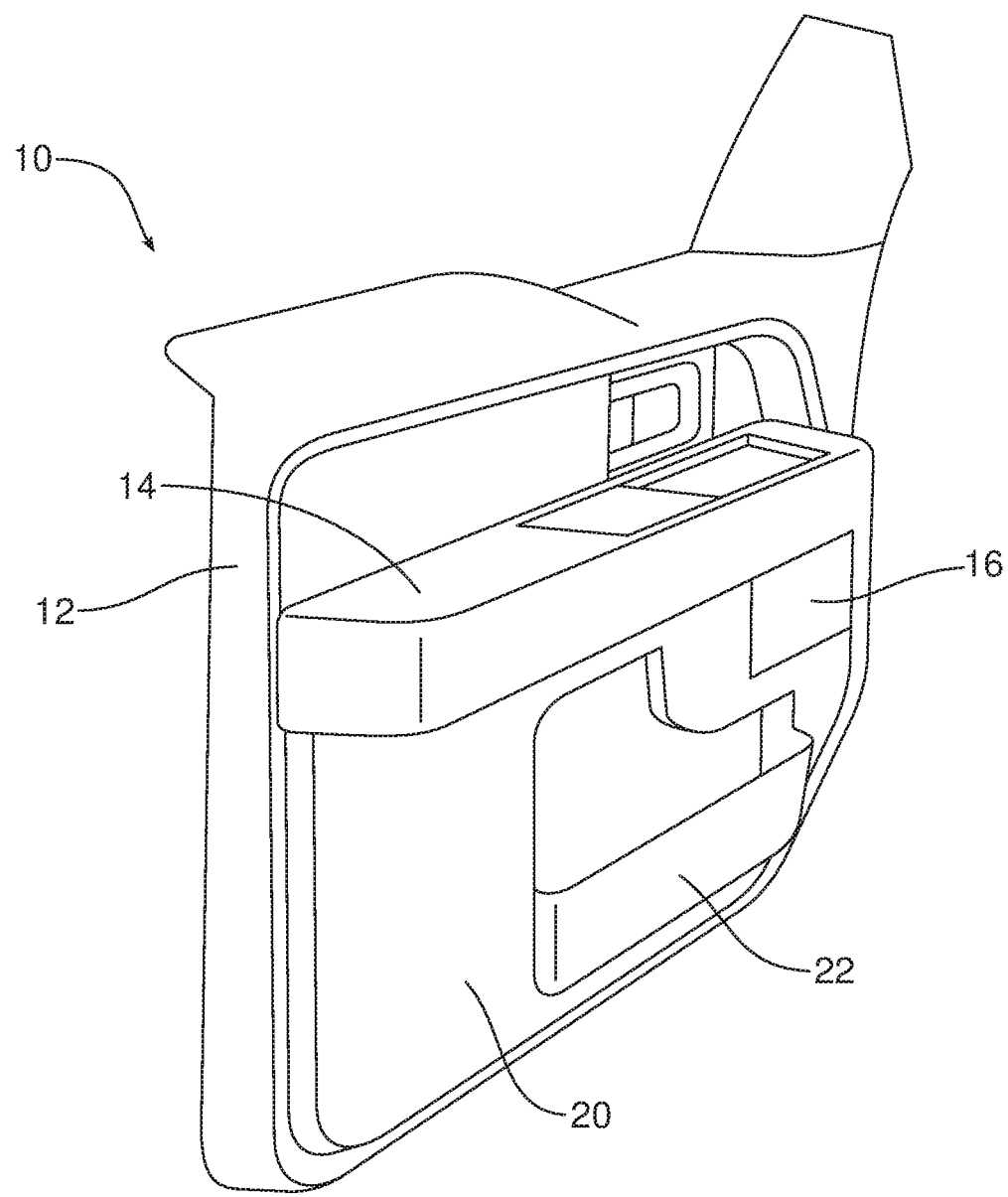
FIG. 1a is a perspective view of a first embodiment of the vehicle door assembly wherein the removable interior door panel is attached to the receiver of the primary door body by means of a retainer.
Figure 1B:
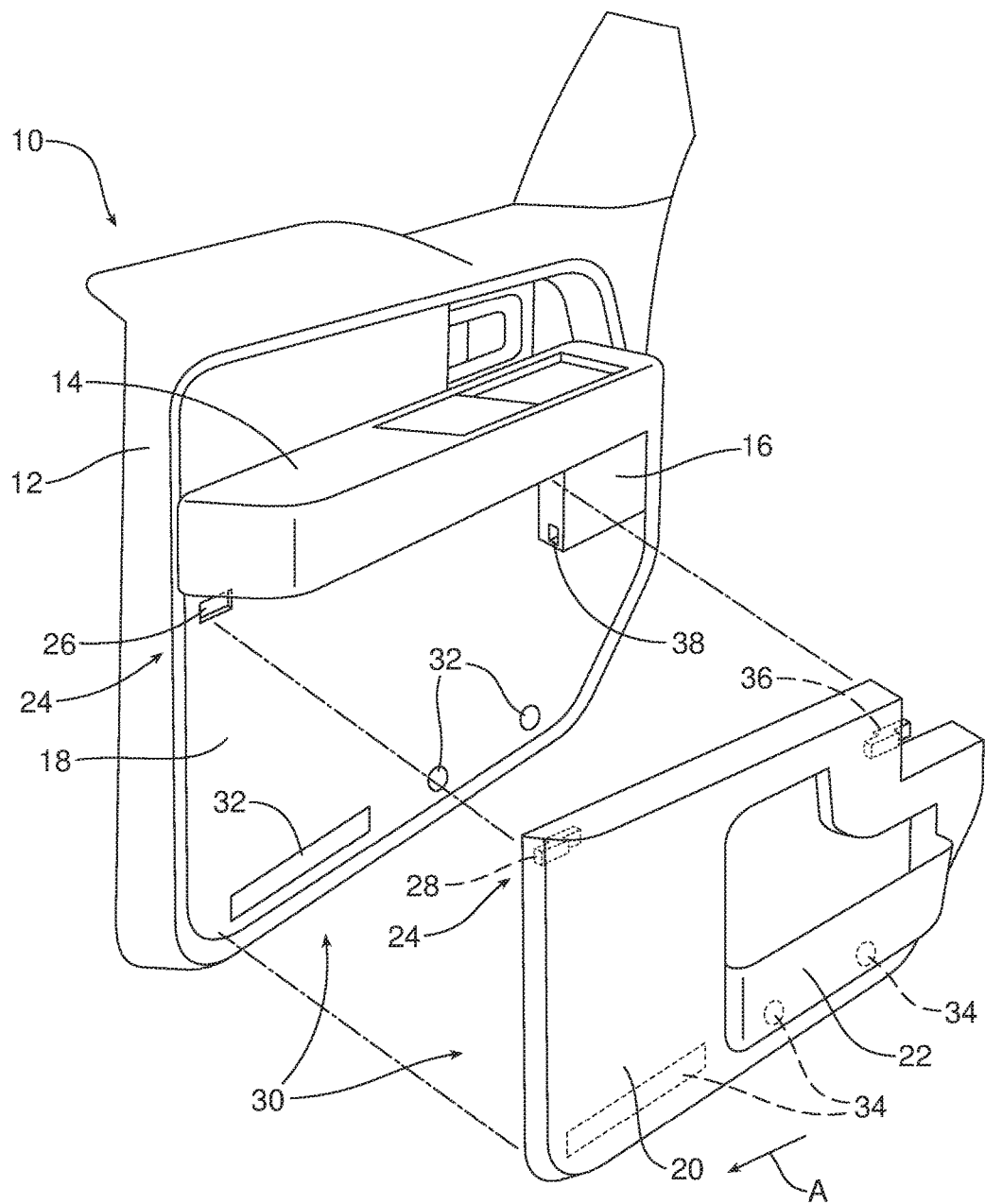
FIG. 1b is a view similar to FIG. 1a but showing the removable interior door panel removed from the receiver of the primary door body.

Reference is now made to FIGS. 1a and 1b illustrating a first embodiment of the vehicle door assembly 10. That vehicle door assembly 10 includes a primary door body 12 including an armrest 14, a speaker assembly 16 and a receiver 18 below the armrest and the speaker assembly 16.

The vehicle door assembly 10 also includes a removable interior door panel 20. The removable interior door panel 20 includes an article storage bin 22. A retainer, generally designated by reference numeral 24, secures the removable interior door panel 20 to the receiver 18 of the primary door body 12. In the illustrated embodiment, the receiver 18 is provided on the primary door body 12 below the armrest 14, and the removable interior door panel 20 is a lower door trim panel.

In the embodiment illustrated in FIGS. 1a and 1b, the retainer 24 includes (a) a securing slot 26 in the receiver 18 under and adjacent to the armrest 14 where it is substantially hidden from sight and (b) a cooperating securing tab 28 on the removable interior door panel 20 which is engaged in the securing slot in order to mount the removable interior door panel 20 in the receiver 18 on the primary door body 12.

As further illustrated in FIG. 1b, the retainer 24 also includes at least one set of magnetic connectors 30 having a first element 32 carried on the receiver 18 and a second element 34 carried on the removable interior door panel 20. More specifically, the first element 32 may be provided behind a decorative cover to provide a more aesthetically pleasing appearance to the receiver 18 when the removable interior door panel is removed from the primary door body. When the removable interior door panel 20 is secured to the receiver 18 of the primary door body 12, the first element 32 and the second element 34 are aligned and attracted together by magnetic force. The first element 32 and second element 34 may both comprise magnets or one element may be a magnet while the other element is a ferromagnetic or paramagnetic material. As further illustrated in FIG. 1b, the retainer 24 may also include a mounting tab 36 on the removable interior door panel 20 that engages in a slot 38 provided in the speaker assembly 16.

FIG. 1a illustrates the removable interior door panel 20 seated on the receiver 18 and secured to the primary door body 12 by means of engagement of the securing tab 28 in the securing slot 26, alignment and magnetic attraction of the first magnet element 32 and the second magnet element 34 and engagement of the mounting tab 36 in the slot 38 of the speaker assembly 16. When one desires to remove the removable interior door panel 20 from the receiver 18 as illustrated in FIG. 1b, one simply grasps the removable interior door panel 20 at the article storage bin 22 or other location, gently pulls it towards the interior of the vehicle and slides it with respect to the receiver 18 in the direction of action arrow A against the force of the magnetic connectors 30 until the securing tab 28 is released from the securing slot 26 and the mounting tab 36 is released from the slot 38. The removable interior door panel 20 is then pulled from the receiver 18 separating the first and second magnet elements 32, 34.

Figure 2A:
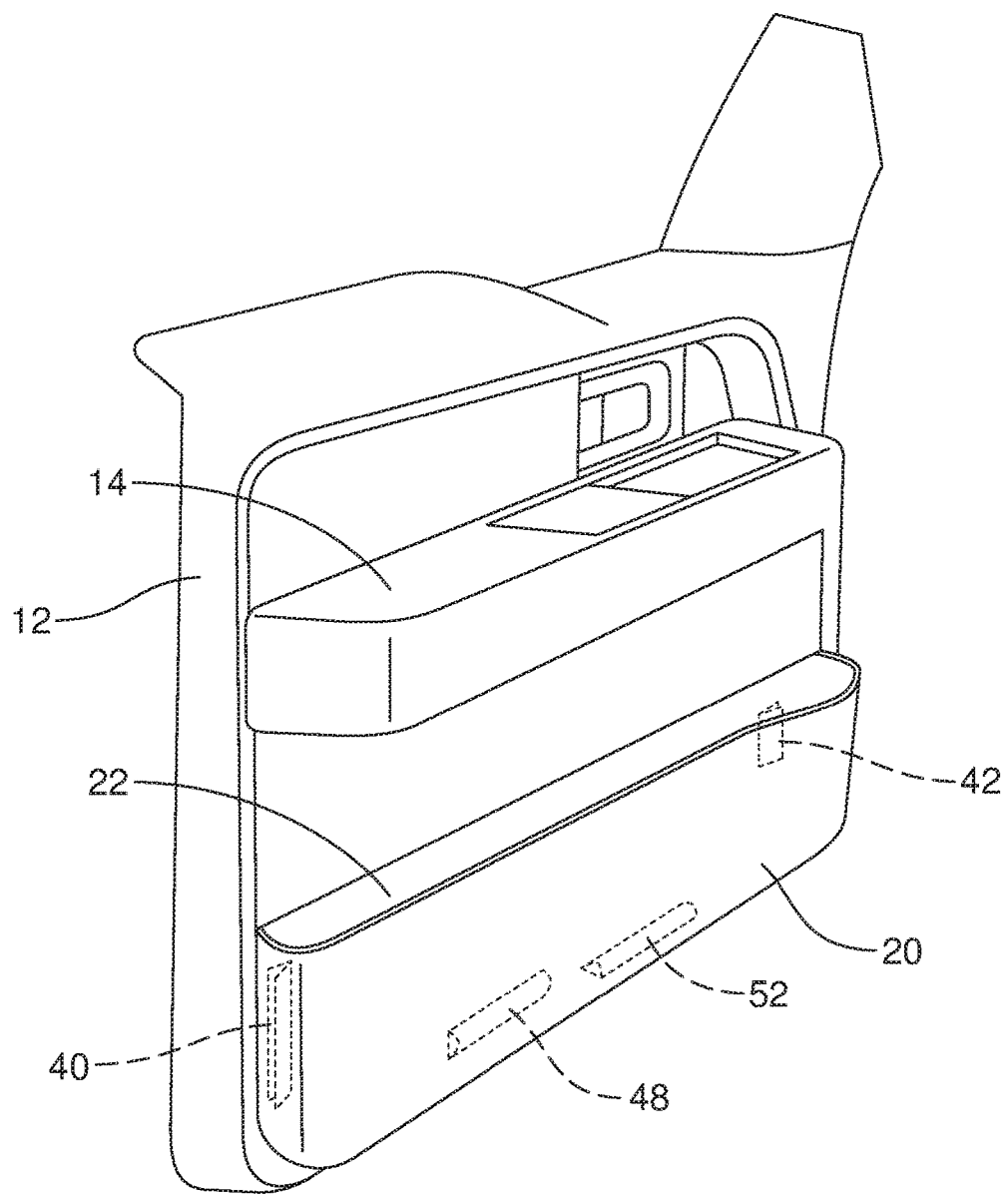
FIG. 2a is a perspective view illustrating a second embodiment of the vehicle door assembly with the removable interior door panel secured in place on the receiver of the primary door body.
Figure 2B:
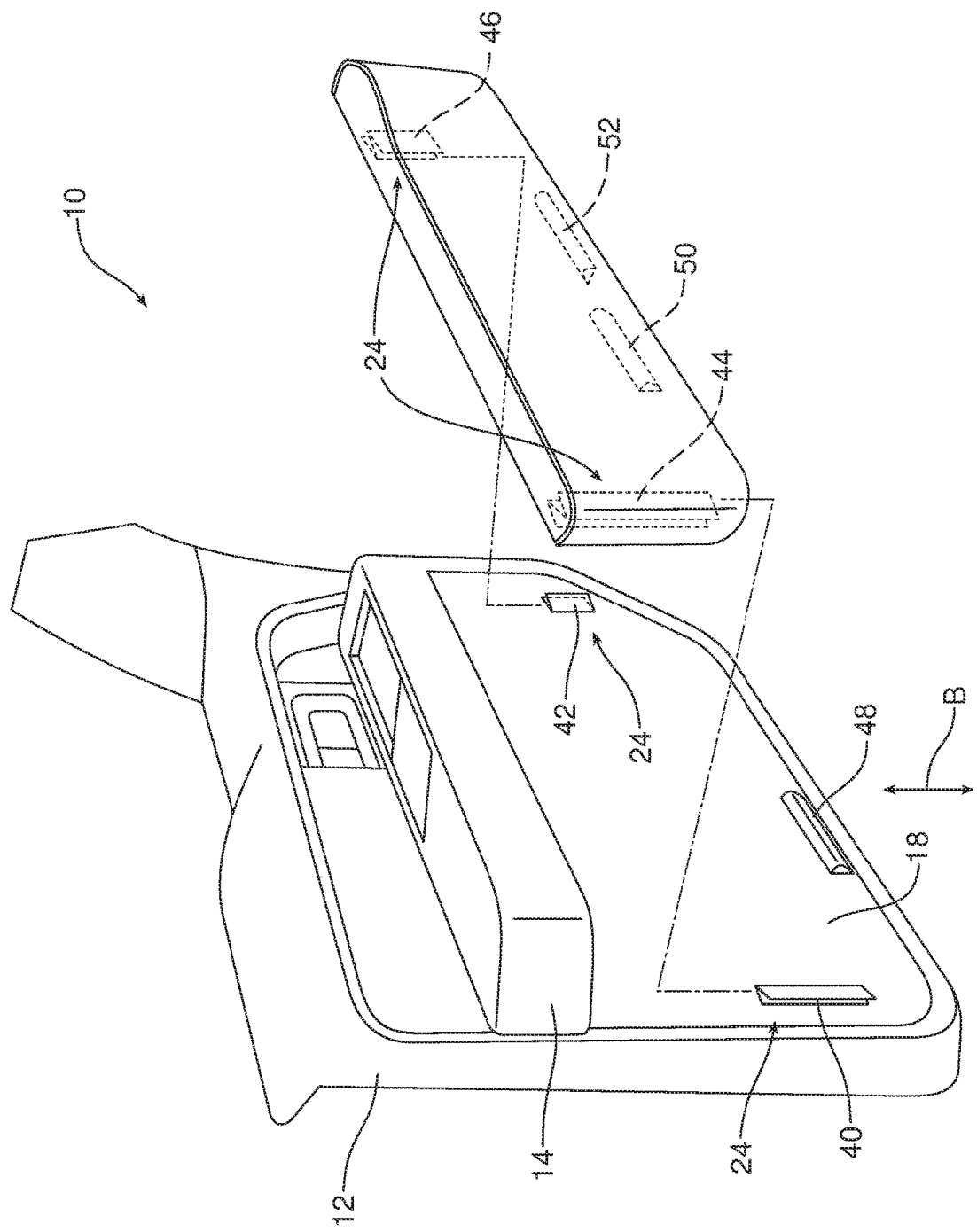
FIG. 2b is a figure similar to FIG. 2a but illustrating the removable interior door panel removed from the receiver of the primary door body.

FIGS. 2a and 2b illustrate an alternative embodiment of the vehicle door assembly 10 wherein like structures include identical reference numbers and a detailed description of these structures is skipped for the sake of brevity of description.

The vehicle door assembly 10 illustrated in FIGS. 2a and 2b has a different design than the vehicle door assembly 10 illustrated in FIGS. 1a and 1b. In the second embodiment illustrated in FIGS. 2a and 2b, the retainer 24 comprises a first attachment track 40 formed in or otherwise carried on the motor vehicle rearward edge of the receiver 18 and a second attachment track 42 molded in or otherwise carried on a motor vehicle-forward edge of the receiver. A first slide block or first follower 44 and a second slide block or second follower 46 are provided on the removable interior door panel 20 at the respective motor vehicle rearward edge and motor vehicle forward edge thereof.

The vehicle door assembly 10 in FIGS. 2a and 2b has a very thin door panel, so the bin pocket is the major part that obstructs the area for easy ingress/egress. In contrast, the vehicle door assembly 10 in FIGS. 1a and 1b has a panel design that is almost as thick as the bin pocket.

The removable interior door panel 20 is secured to the receiver 18 of the primary door body 12 by aligning the first and second followers 44, 46 with the respective first and second attachment tracks 40, 42 and then sliding the removable interior door panel 20 upward with respect to the receiver 18 until the two followers 44, 46 are fully secured in the two attachment tracks 40, 42. Here it should be noted that the receiver includes a tab or lug 48 along the bottom edge thereof. When the removable interior door panel 20 is properly seated on the receiver 18, the recess or pocket 50 of the panel receives the lug 48 and this prevents the removable interior door panel 20 from sliding up or down with respect to the receiver 18 and the primary door body 12.

FIG. 2a illustrates the removable interior door panel 20 in the installed position. When one wishes to remove the removable interior door panel 20, one engages the recessed finger grip 52 of the removable interior door panel and pulls outward from the primary door body until the pocket 50 is free of the lug 48. One then slides the removable interior door panel 20 up or down (note action arrow B) with respect to the receiver 18 so that the two followers 44, 46 slide free from the two attachment tracks 40, 42. FIG. 2b illustrates the removable interior door panel removed from the primary door body 12.

FIGS. 3a-3d illustrate a plurality of interchangeable removable door panels 20, 54, 60 and 74 that may be selected and secured to the receiver 18 in order to customize the motor vehicle door assembly to the needs and desires of the motor vehicle operator. In this way, one may select a removable door panel 20, 54, 60 or 74 with an article storage bin best suited to a particular article transport application.

Figure 3A:
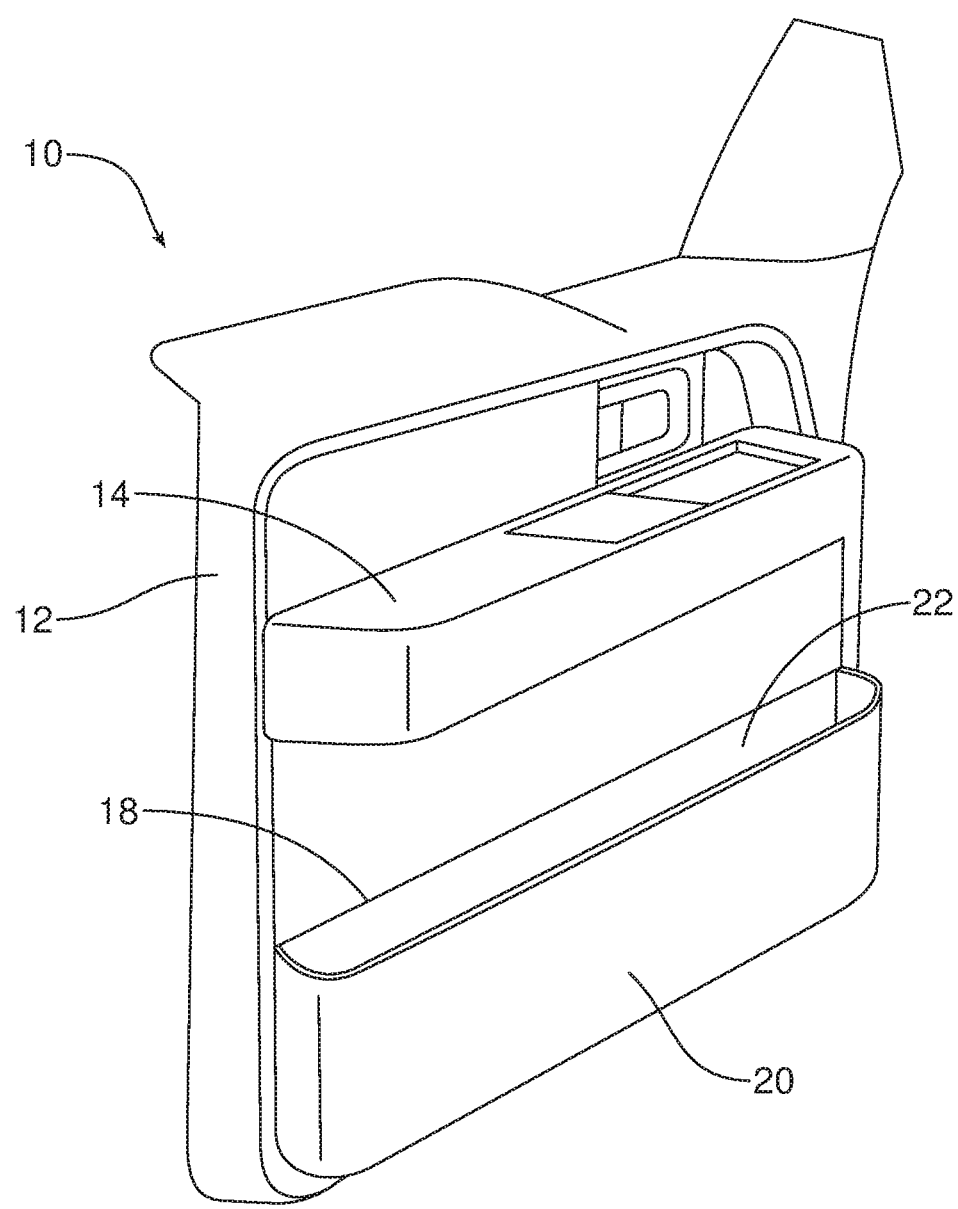
Figure 3B:
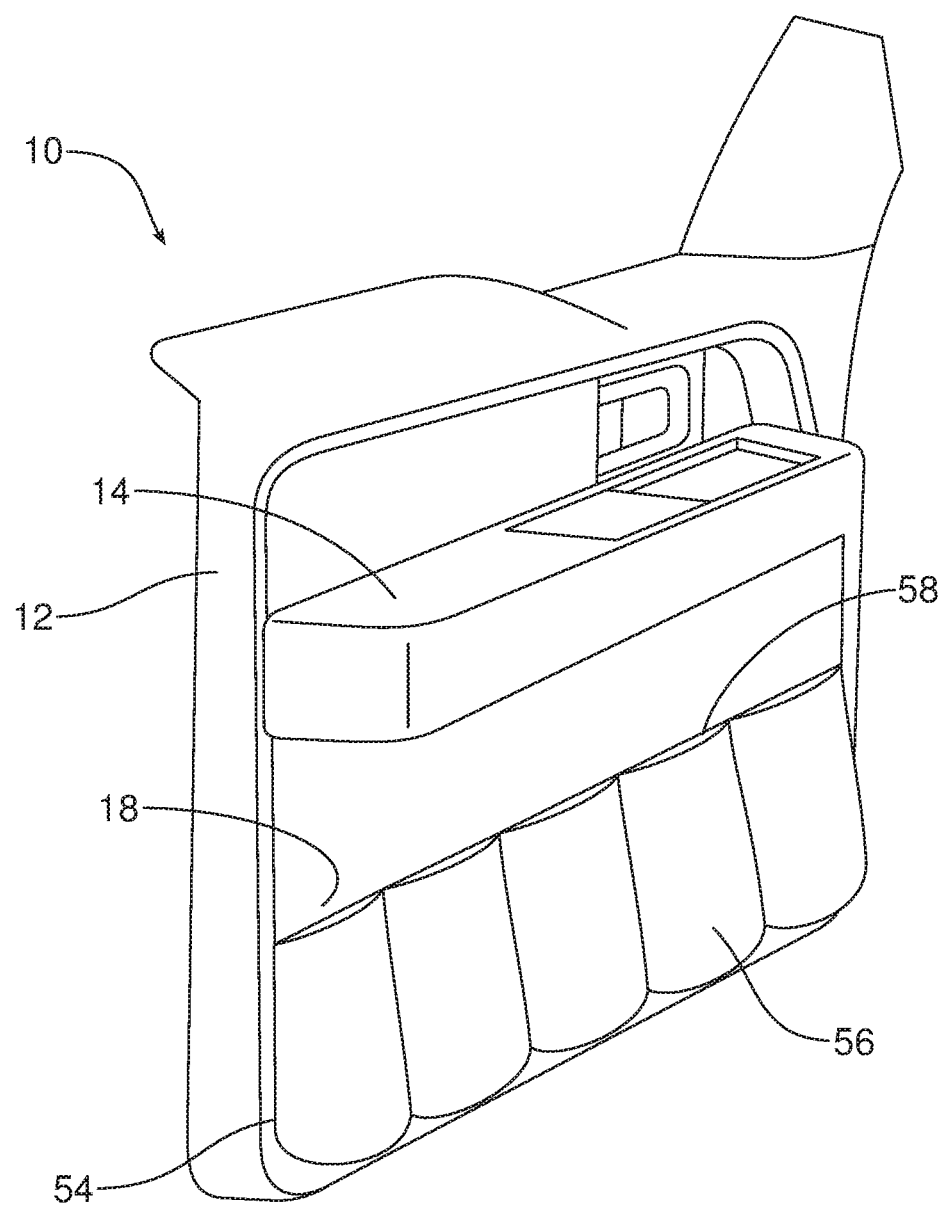

FIG. 3a illustrates a vehicle door assembly 10 incorporating the first removable interior door panel 20 which includes a first article storage bin 22 in the form of a single elongated map pocket. The first removable interior door panel 20 is a lower door trim panel provided below the armrest 14. FIG. 3b illustrates a vehicle door assembly 10 incorporating a second removable interior door panel 54 including a second article storage bin 56 in the form of a soft fabric pocket with an elastic gatherer 58.

Figure 3C:
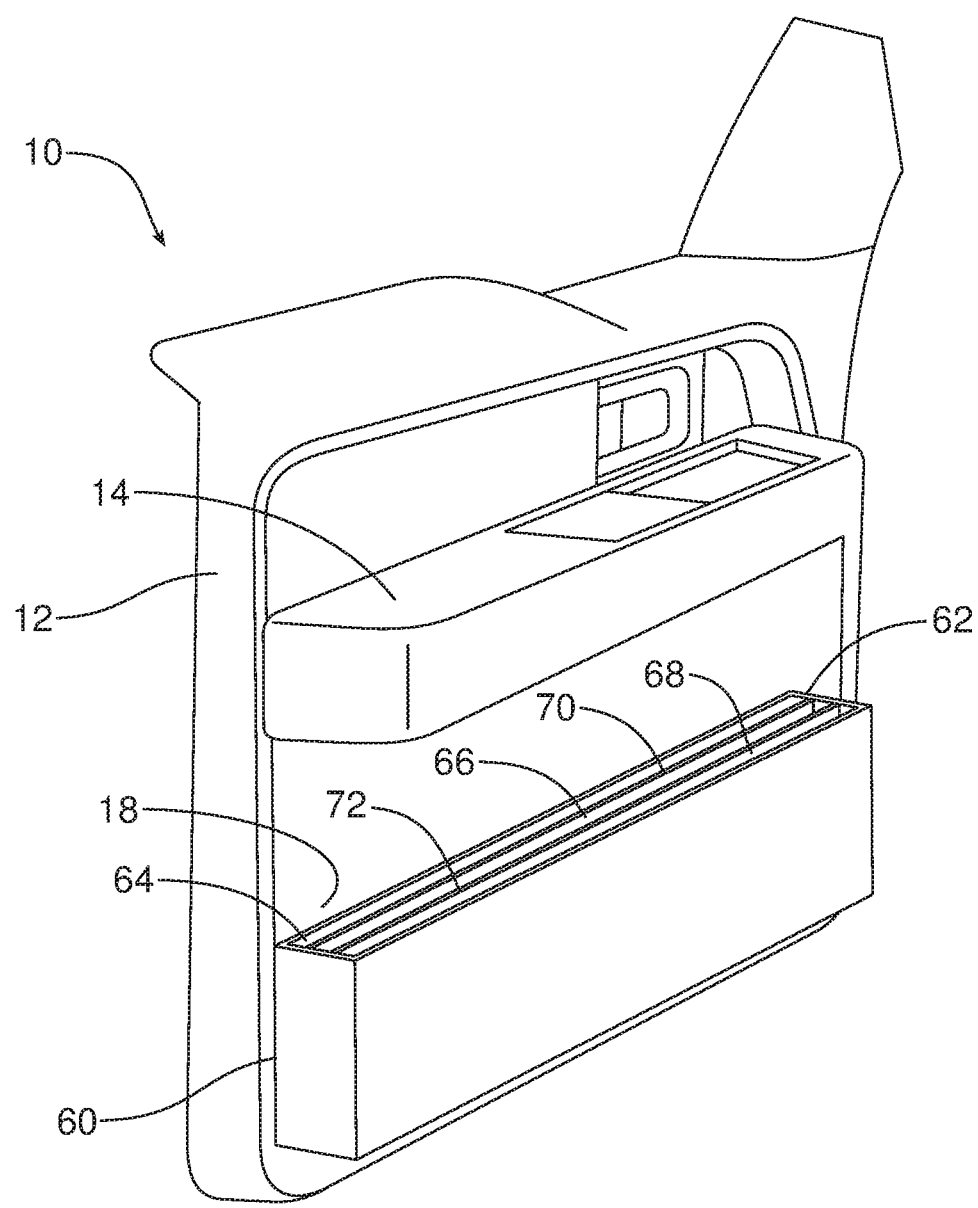

FIG. 3c illustrates a vehicle door assembly 10 incorporating a third removable interior door panel 60 having a third article storage bin 62 comprising a storage compartment partitioned into chambers 64, 66, 68 by dividers 70 and 72.

Figure 3D:
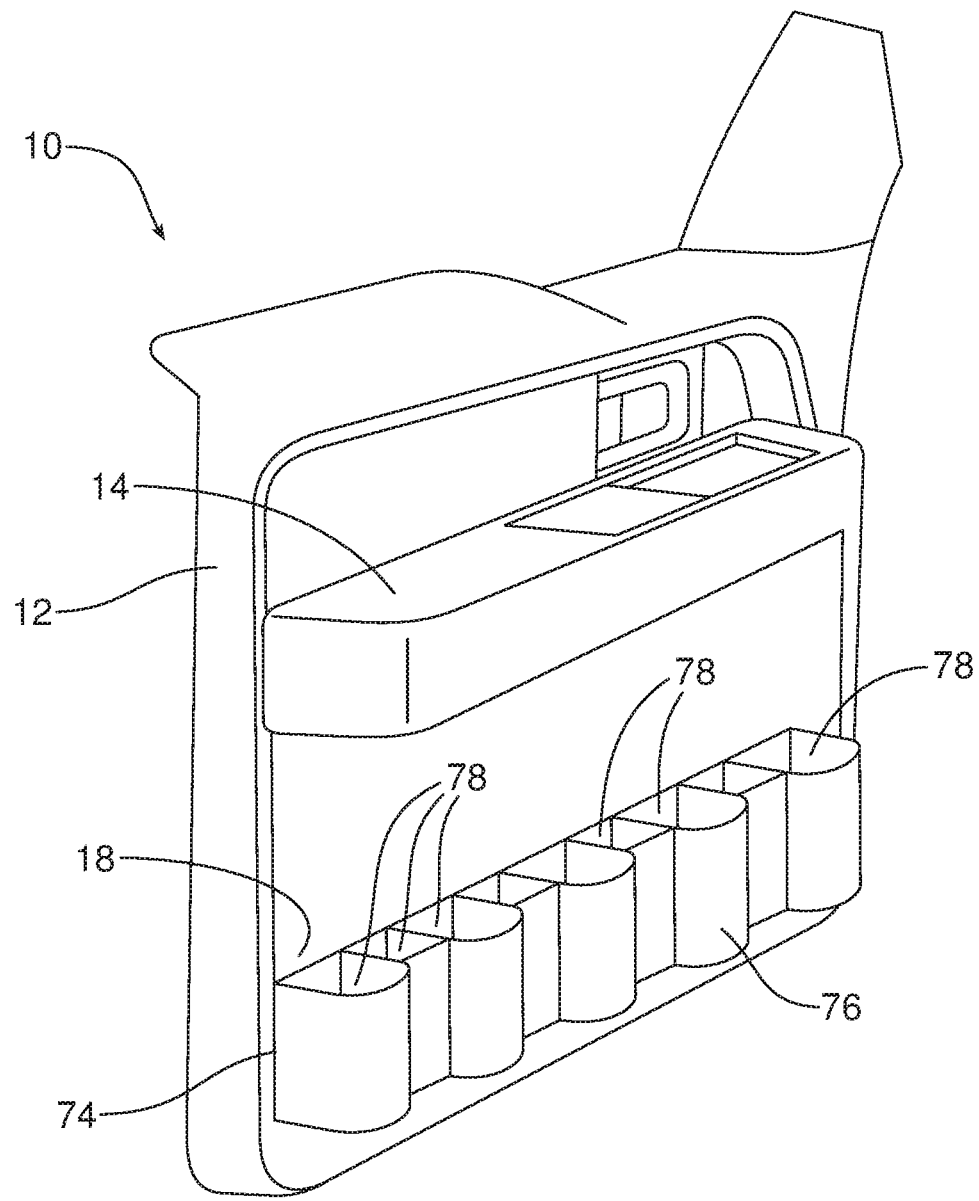

FIG. 3d illustrates a vehicle door assembly 10 incorporating a fourth removable interior door panel 74 having a fourth article storage bin 76 including multiple storage compartments 78. One or more of the storage compartments 78 may be sized and shaped to hold a drink can, bottle or cup.

Each of the removable interior door panels 20, 54, 60, 74 illustrated in FIGS. 3a-3d includes the same retainer (not shown FIGS. 3a-3d) and are interchangeable for receipt on a receiver 18 of a primary door body 12. One may select the removable interior door panel 20, 54, 60, 74 suited for a particular use or application and secure it to the receiver 18 of the primary door body 12. This allows that person to customize the storage option at the lower portion of the vehicle door assembly 10 under the armrest 14 to best meet one's needs.

Reference is now made to FIGS. 4a and 4b illustrating how the vehicle door assembly 10 equipped with the removable interior door panel 20 allows one to more easily get into and out of the motor vehicle when an obstruction O limits the angle A to which the vehicle door assembly may be opened. As shown in FIG. 4a, when the removable interior door panel 20 is secured on the receiver 18 of the primary door body 12, the gap G between the vehicle door assembly 10 and the rocker panel or threshold opening R of the motor vehicle is very narrow. This makes ingress and egress from the motor vehicle particularly difficult and this problem is worsened if the operator is carrying a purse or other personal item.

In this situation, the operator may relatively easily remove the removable interior door panel 20 from the receiver 18 of the primary door body 12 in the manner described above. As illustrated in FIG. 4b, this increases the width of the gap G between the vehicle door assembly 10 and the rocker panel or threshold opening R to allow one to more easily enter or exit the motor vehicle. Afterwards, the operator may replace or reinstall removable interior door panel 20 on the receiver 18 by means of the retainer 24 in a manner described above.

The foregoing has been presented for purposes of illustration and description. It is not intended to be exhaustive or to limit the embodiments to the precise form disclosed. Obvious modifications and variations are possible in light of the above teachings. For example, the retainer of the first embodiment comprises cooperating slots 26, 38 and tabs 28, 36 as well as magnetic connectors 30. In contrast, the second embodiment illustrated in FIGS. 2a-2b includes a retainer 24 having cooperating attachment tracks 40, 42 and followers 44, 46 as well as a lug 48 and cooperating pocket 50. Other retainers may be utilized if desired. All such modifications and variations are within the scope of the appended claims when interpreted in accordance with the breadth to which they are fairly, legally and equitably entitled.

What is claimed:

1. A vehicle door assembly, comprising:
a primary door body including a receiver;
a removable interior door panel including an article storage bin that projects away from said primary door body; and
a retainer securing said removable interior door panel to said receiver wherein said retainer is selected from a group consisting of a magnetic connector, an attachment track or a magnetic connector and an attachment track.

2. The vehicle door assembly of claim 1, wherein said primary door body includes an armrest and said retainer includes (a) a securing slot in said receiver under and adjacent to said armrest and (b) a cooperating securing tab on said removable interior door panel engaged in said securing slot.

3. The vehicle door assembly of claim 2, wherein said retainer further includes at least one set of magnetic connectors having a first element carried on said receiver and a second element carried on said removable interior door panel wherein said first element is aligned with and attracted to said second element.

4. The vehicle door assembly of claim 3, wherein said one set of magnetic connectors is provided adjacent a bottom edge of said primary door body.

5. The vehicle door assembly of claim 4, wherein said primary door body includes a speaker assembly and said removable interior door panel includes a mounting tab engaging said speaker assembly.

6. The vehicle door assembly of claim 1, wherein said retainer comprises a first attachment track along a motor vehicle-rearward edge of said receiver and a second attachment track along a motor vehicle-forward edge of said receiver.

7. The vehicle door assembly of claim 6, including a lug adjacent a lower edge of said receiver.

8. The vehicle door assembly of claim 7, further including a first follower on said removable interior door panel engaged in said first attachment track and a second follower on said removable interior door panel engaged in said second attachment track.

9. The vehicle door assembly of claim 8, wherein said removable interior door panel includes a pocket receiving said lug.

10. The vehicle door assembly of claim 1, further including a modification kit including a second removable interior door panel having a second different article storage bin wherein said second removable interior door panel may be substituted on said receiver for said removable interior door panel to tailor storage options on said vehicle door assembly.

11. The vehicle door assembly of claim 10, wherein said modification kit includes a third removable interior door panel having a third different article storage bin and wherein said third removable interior door panel may be substituted on said receiver for said removable interior door panel or said second removable interior door panel.

12. The vehicle door assembly of claim 11, wherein said modification kit includes a fourth removable interior door panel having a fourth different article storage bin and wherein said fourth removable interior door panel may be substituted on said receiver for said removable interior door panel, said second removable interior door panel or said third removable interior door panel.

13. A method of enhancing ease of ingress and egress from a motor vehicle when an adjacent obstruction limits how far a motor vehicle door assembly may be opened, comprising:
removing a removable interior door panel from a receiver on a primary door body of said motor vehicle door assembly in order to provide additional space between said primary door body and a door threshold of the motor vehicle when said motor vehicle door assembly is partially opened.

14. The method of claim 13, further including releasing a retainer prior to removing said removable interior door panel from said receiver on said primary door body.

15. A method of customizing a motor vehicle door assembly to meet needs of a particular article transport application, comprising:
selecting a particular removable door panel with a particular article storage bin from a plurality of interchangeable removable door panels; and
securing said particular removable door panel with said particular article storage bin to a receiver on a primary door body of a motor vehicle.

16. The method of claim 15, further including removing said particular removable door panel with said particular article storage bin from said receiver, selecting a second removable door panel from said plurality of interchangeable removable door panels and securing said second removable door panel to said receiver on said primary door body.

17. The method of claim 15, further including securing said second removable interior door panel to said receiver by said retainer.

\* \* \* \* \*